United States Patent
Yi et al.

(10) Patent No.: US 10,257,807 B2
(45) Date of Patent: Apr. 9, 2019

(54) METHOD AND APPARATUS FOR SUPPORTING VARIABLE TRANSPORT BLOCK SIZE WITHOUT ASSOCIATED DOWNLINK CONTROL INFORMATION IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/529,757

(22) PCT Filed: Dec. 7, 2015

(86) PCT No.: PCT/KR2015/013284
§ 371 (c)(1),
(2) Date: May 25, 2017

(87) PCT Pub. No.: WO2016/089184
PCT Pub. Date: Jun. 9, 2016

(65) Prior Publication Data
US 2017/0311286 A1    Oct. 26, 2017

Related U.S. Application Data

(60) Provisional application No. 62/087,816, filed on Dec. 5, 2014.

(51) Int. Cl.
*H04W 72/12* (2009.01)
*H04W 72/00* (2009.01)
(Continued)

(52) U.S. Cl.
CPC .......... *H04W 72/005* (2013.01); *H04J 11/00* (2013.01); *H04L 1/0015* (2013.01);
(Continued)

(58) Field of Classification Search
CPC .......... H04W 72/005; H04W 72/1278; H04W 72/1273; H04W 4/70; H04L 5/0092;
(Continued)

(56) References Cited

U.S. PATENT DOCUMENTS 9,532,337 B2 * 12/2016 Nimbalker ............. H04L 5/001
2003/0074476 A1 * 4/2003 Kim ..................... H04L 1/0013
709/246

(Continued)

OTHER PUBLICATIONS

3GPP TS 36.331 V12.3.0 (Sep. 2014); 3rd Generation Partnership Project; Technical Specification Group Radio Access Network; Evolved Universal Terrestrial Radio Access (E-UTRA); Radio Resource Control (RRC); Protocol specification (Release 12); 380 pages; See p. 214.

(Continued)

*Primary Examiner* — Jay P Patel
(74) *Attorney, Agent, or Firm* — Birch, Stewart, Kolasch & Birch, LLP

(57) ABSTRACT

A method and apparatus for transmitting cell-broadcast data in a wireless communication system is provided. A base station determines a transport block size (TBS) based on an aggregation level, and transmits the cell-broadcast data to a machine-type communication (MTC) user equipment (UE) by using the TBS. That is, different TBSs may be determined based on different aggregation levels.

14 Claims, 5 Drawing Sheets

(51) Int. Cl.
*H04W 4/70* (2018.01)
*H04J 11/00* (2006.01)
*H04L 1/00* (2006.01)
*H04L 5/00* (2006.01)
*H04L 27/26* (2006.01)
*H04L 1/16* (2006.01)

(52) U.S. Cl.
CPC .......... *H04L 1/0032* (2013.01); *H04L 1/0084* (2013.01); *H04L 5/001* (2013.01); *H04L 5/0044* (2013.01); *H04L 5/0053* (2013.01); *H04L 5/0092* (2013.01); *H04L 27/2617* (2013.01); *H04W 4/70* (2018.02); *H04W 72/1273* (2013.01); *H04W 72/1278* (2013.01); *H04L 1/1671* (2013.01)

(58) Field of Classification Search
CPC ... H04L 5/001; H04L 5/0053; H04L 27/2617; H04L 1/0032; H04L 5/0044; H04L 1/0084; H04L 1/0015; H04L 1/1671; H04J 11/00
See application file for complete search history.

(56) References Cited

U.S. PATENT DOCUMENTS

| | | | | |
|---|---|---|---|---|
| 2010/0023830 | A1* | 1/2010 | Wengerter | H04L 1/0025 714/748 |
| 2010/0080152 | A1* | 4/2010 | Lindh | H04L 1/1812 370/280 |
| 2010/0184489 | A1* | 7/2010 | Penther | H04W 52/029 455/574 |
| 2013/0182653 | A1* | 7/2013 | Earnshaw | H04L 1/1822 370/329 |
| 2014/0133395 | A1* | 5/2014 | Nam | H04B 7/0452 370/328 |
| 2015/0117181 | A1* | 4/2015 | Lee | H04L 41/0654 370/225 |
| 2015/0208453 | A1* | 7/2015 | Yamazaki | H04W 76/14 370/329 |
| 2015/0271006 | A1* | 9/2015 | Han | H04L 1/001 370/329 |
| 2015/0341956 | A1* | 11/2015 | Sun | H04L 1/0046 370/329 |
| 2015/0372784 | A1* | 12/2015 | Xu | H04L 27/36 370/329 |
| 2016/0073381 | A1* | 3/2016 | Ratasuk | H04W 4/70 370/329 |
| 2016/0205542 | A1* | 7/2016 | Yavuz | H04W 8/24 455/435.1 |
| 2016/0309470 | A1* | 10/2016 | Yi | H04W 56/001 |
| 2017/0111159 | A1* | 4/2017 | Lee | H04L 5/001 |
| 2017/0134879 | A1* | 5/2017 | Wong | H04W 4/70 |
| 2017/0331611 | A1* | 11/2017 | Stern-Berkowitz | H04L 1/1854 |

OTHER PUBLICATIONS

Huawei et al., "Control-less transmission of common messages for low complexity Rel-13 UEs", R1-144583, 3GPP TSG RAN WG1 Meeting #79, San Francisco, USA, Nov. 17-21, 2014, See pp. 1-3.
Huawei et al., "Transmission of small transport blocks", R1-145099, 3GPP TSG RAN WG1 Meeting #79, San Francisco, USA, Nov. 17-21, 2014, See pp. 1-4, and table 1.
KT Corp., "Considerations on common control messages", R1-144251, 3GPP TSG RAN WG1 Meeting #78bis, Ljubljana, Slovenia, Oct. 6-10, 2014, See pp. 1-2.
LG Electronics, "Data and control channels for MTC", R1-144038, 3GPP TSG RAN WG1 Meeting #78bis, Ljubljana, Slovenia, Oct. 6-10, 2014, See pp. 1-3.

* cited by examiner

[Fig. 1]
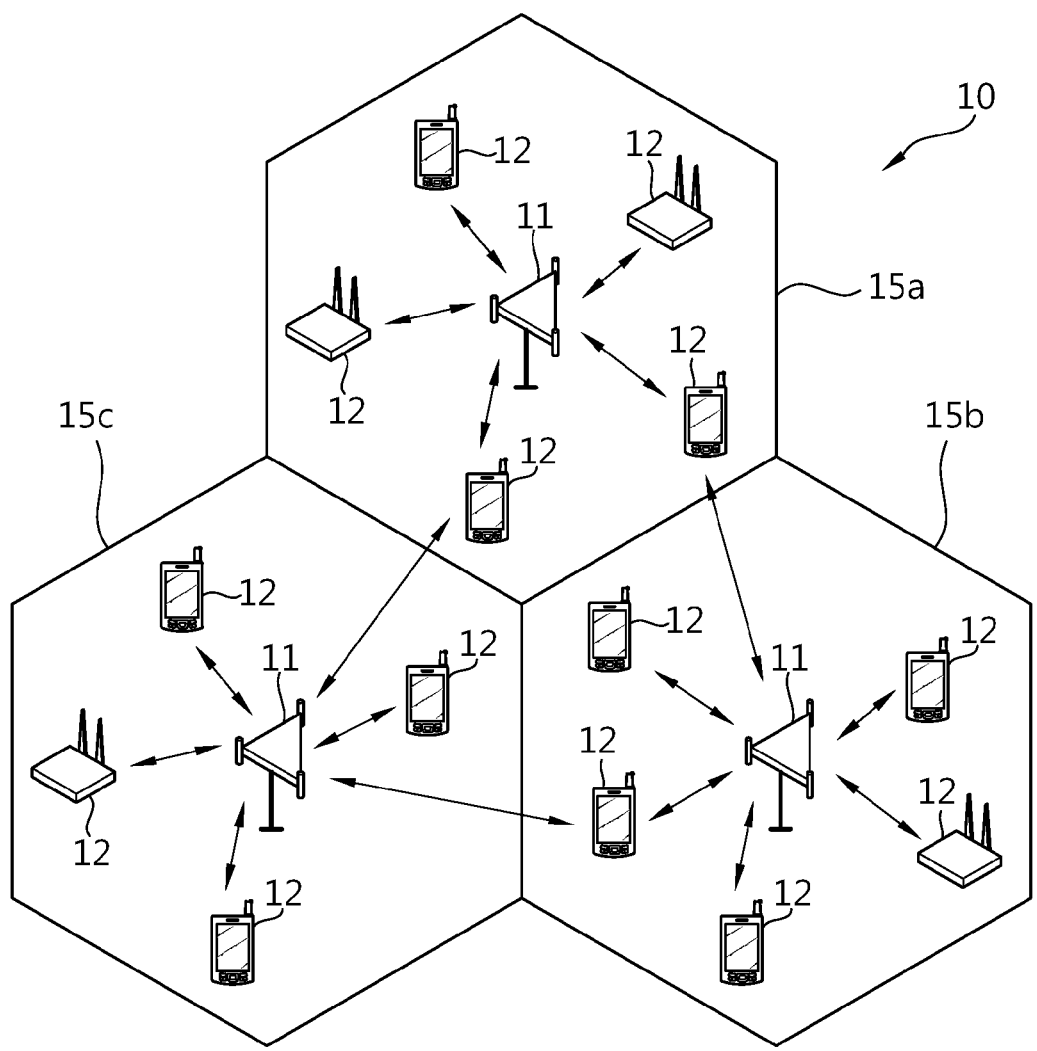
[Fig. 2]
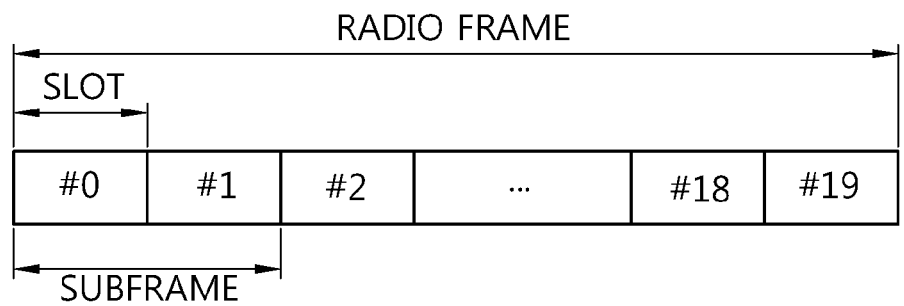

[Fig. 3]
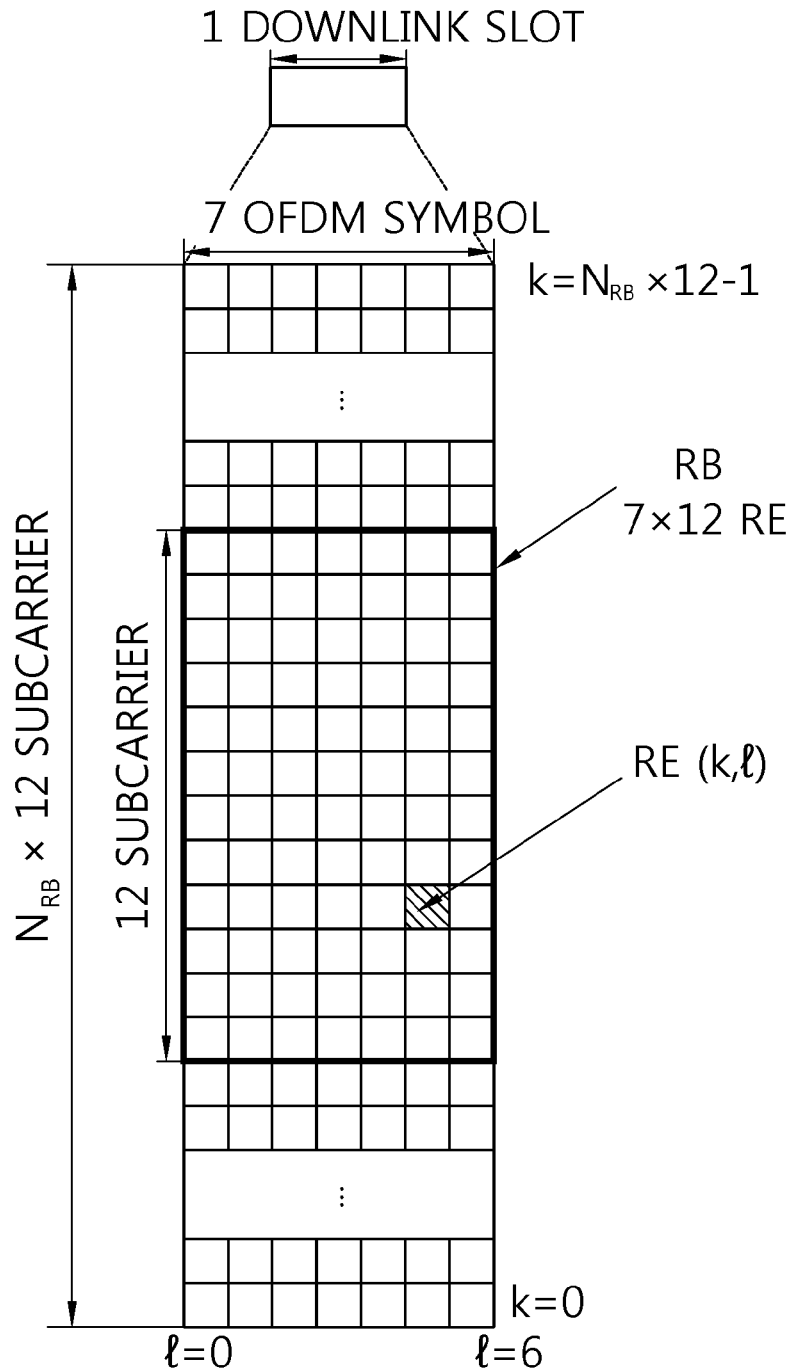

[Fig. 4]
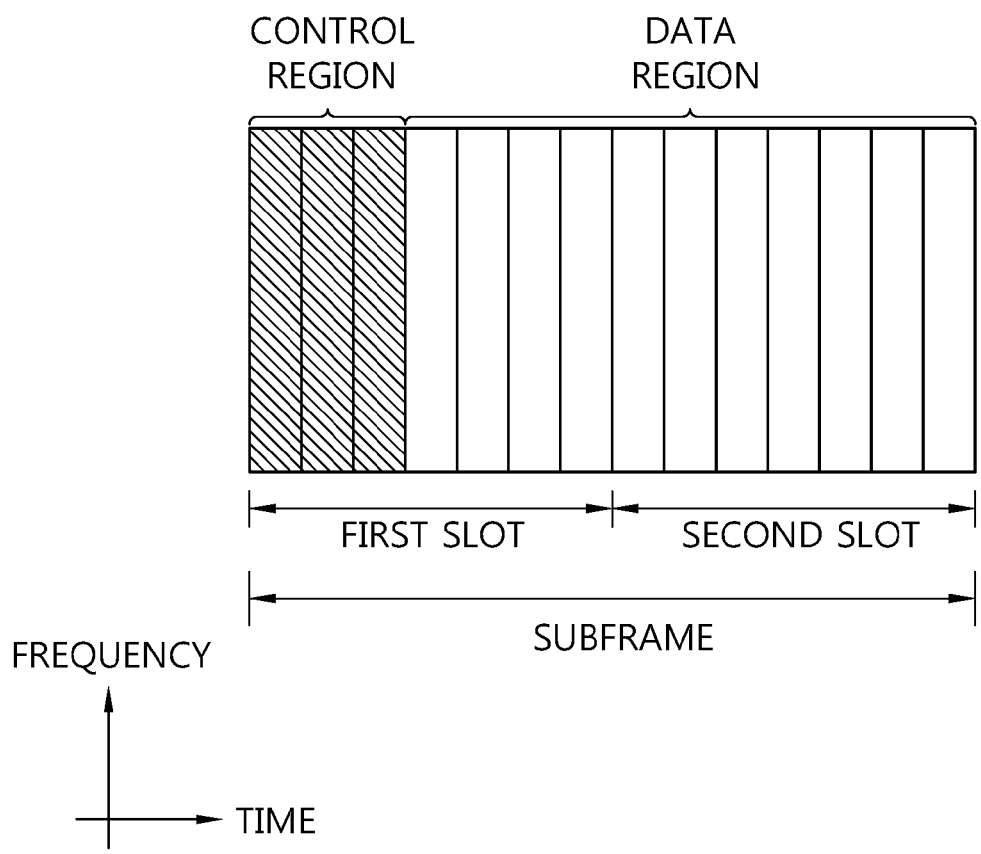

[Fig. 5]
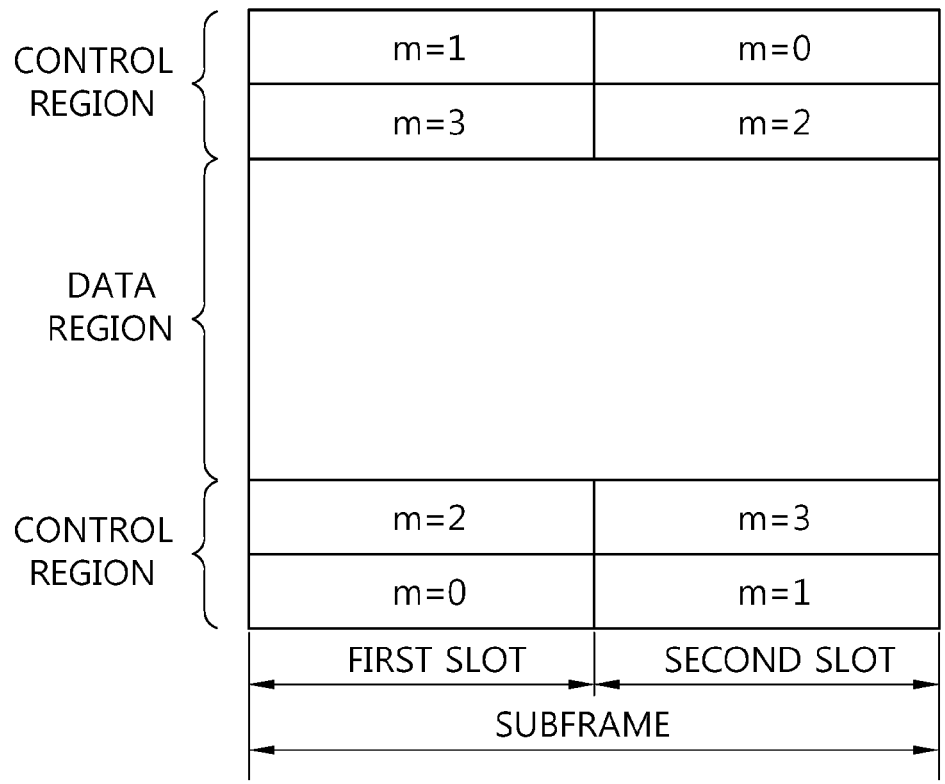
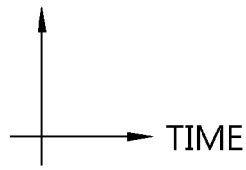
[Fig. 6]
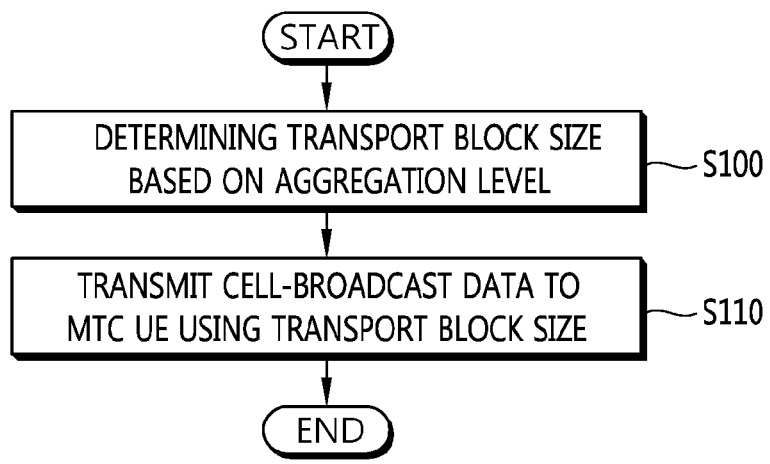

[Fig. 7]
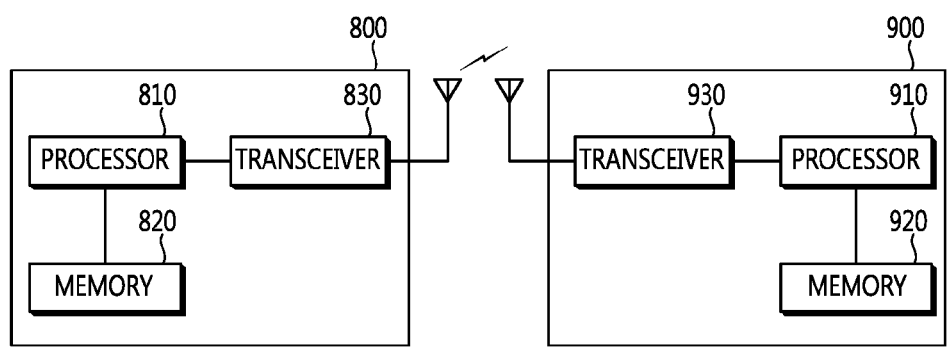

METHOD AND APPARATUS FOR SUPPORTING VARIABLE TRANSPORT BLOCK SIZE WITHOUT ASSOCIATED DOWNLINK CONTROL INFORMATION IN WIRELESS COMMUNICATION SYSTEM

CROSS REFERENCE TO RELATED APPLICATIONS

This application is the National Phase of PCT International Application No. PCT/KR2015/013284, filed on Dec. 7, 2015, which claims priority under 35 U.S.C. 119(e) to U.S. Provisional Application No. 62/087,816, filed on Dec. 5, 2014, all of which are hereby expressly incorporated by reference into the present application.

TECHNICAL FIELD

The present invention relates to wireless communications, and more particularly, to a method and apparatus for supporting variable transport block size (TBS) without associated downlink control information (DCI) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

The network may transmit cell-broadcast data to large numbers of MTC UEs. However, due to characteristic of MTC UEs, the conventional scheduling for transmission of the cell-broadcast data may not be necessary. Accordingly, a method for transmitting cell-broadcast data to MTC UEs efficiently may be required.

DISCLOSURE OF INVENTION

Technical Problem

The present invention provides a method and apparatus for supporting variable transport block size (TBS) without associated downlink control information (DCI) in a wireless communication system. The present invention provides a method and apparatus for supporting physical downlink shared channel (PDSCH) transmission without the associated DCI. The present invention provides a method and apparatus for assigning modulation and coding scheme (MCS) and changing variable size of transport block.

Solution to Problem

In an aspect, a method for transmitting, by a base station, cell-broadcast data in a wireless communication system is provided. The method includes determining a transport block size (TBS) based on an aggregation level, and transmitting the cell-broadcast data to a machine-type communication (MTC) user equipment (UE) by using the TBS.

In another aspect, a base station is provided. The base station includes a memory, a transceiver, and a processor coupled to the memory and the transceiver, and configured to determine a transport block size (TBS) based on an aggregation level, and control the transceiver to transmit a cell-broadcast data to a machine-type communication (MTC) user equipment (UE) by using the TBS.

Advantageous Effects of Invention

Cell-broadcast data for MTC UEs can be transmitted efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows a method for transmitting cell-broadcast data according to an embodiment of the present invention.
FIG. 7 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SCFDMA is in use as a UL multi-access scheme, the OFDM symbols may be called SCFDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

In addition to the conventional PDCCH of Rel-8, the enhanced PDCCH (EPDCCH) is available in Rel-11. The EPDCCH uses PDSCH resources for control information transmission. It is UE-specific, meaning that different UEs can have different EPDCCH configurations. The EPDCCH is configured via RRC signaling. Each UE may be configured with two sets of EPDCCHs. The configuration may also be different between the two sets. Each EPDCCH set may have 2, 4, or 8 PRB pairs. One enhanced resource element group (EREG) consists of 9 resource elements (REs), and, one enhanced control channel element (ECCE) normally has 4 EREGs. But in some cases, such as extended CP or special subframe in a TDD system, one ECCE may also consist of 8 EREGs. Finally, one EPDCCH will have one or more ECCEs depending on the aggregation level. Since EPDCCH is UE specific, only UE-specific search space may be used for the EPDCCHs. DCI formats 3/3A and 1C for multiple UEs are not supported in EPDCCHs. UE may need fast PDSCH decoder to meet HARQ timing because it needs to wait until the end of the subframe to detect the entire EPDCCH. For resource utilization efficiency, the resource blocks which have been configured for EPDCCHs in a subframe may still be used for PDSCH transmission if they are not actually used for the EPDCCH transmissions during a given subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification.

Considering a limited bandwidth for a low complexity UE or UE supporting small bandwidth than the wideband system bandwidth, dynamic control information which mainly assigns modulation and coding scheme (MCS) and resource allocation may not be necessary. Particularly, for cell-broadcast data which will be scheduled to cover all UEs in the network, it is likely that a fixed MCS will be used. Furthermore, other transmission scheme techniques, such as MIMO, may not be used. Thus, most information carried in DCI may be eliminated or removed as long as there is no necessity of resource allocation. There may be multiple types of cell-broadcast data. Accordingly, a method for (pre-) allocating potential resources used for each type of cell-broadcast data without DCI may be required.

Hereinafter, a method for supporting variable transport block size (TBS) without associated DCI according to an embodiment of the present invention is described. According to an embodiment of the present invention, (1) resource allocation, (2) MCS determination, (3) TBS determination, and (4) search space design for cell-broadcast data without associated DCI may be proposed. Hereinafter, all of a MTC UE, a low cost UE, a low end UE, a low complexity UE, a narrow(er) band UE, a small(er) band UE, or a new category UE may be used mixed with each other. Or, just a UE may refer one of UEs described above. In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality.

1. Resource allocation for cell-broadcast data according to an embodiment of the present invention is described. In terms of allocating the location of resources for cell-broadcast data, prefixed location per each SIB with prefixed periodicity may be considered. For each cell-broadcast data, the location of resource in terms of time/frequency/MCS/ TBS may be fixed. In each resource assigned to each SIB, a UE may assume that SIB transmission will be occurred. It may be further assumed that the size of SIB is also fixed such that a UE may assume receiving of SIB transmission in the allocated resource. Since the resource is fixed and assigned per each SIB which will be assumed to be transmitted in the allocated resource, different resource per each SIB may be assigned. As it is likely that there may be multiple UE types which may or may not support frequency retuning, the location of SIB may be fixed in center 6 PRBs.

For TDD, since this approach may be applied to all TDD DL/UL configuration, the possible location of SIB1 may be subframe #5 of center 6 PRBs, and different 6 PRBs. Alternatively, the possible location of SIB1 may be subframe #0 different than center 6 PRBs. Further, special subframe may be considered for the possible location of SIB1 if special subframe configuration #0/#5 (in normal CP) (special subframe configuration with short DwPTS length) is not supported by the MTC operation. To cover other special subframe configurations, only the OFDM symbols in the first slot may be used for SIB transmission regardless of actual DwPTS length. For FDD, the same location as in case of TDD described above may be used.

Further, a set of locations may be reserved for cell-broadcast data which may be separately configured. The set of locations may be shared by multiple cell-broadcast data. The set of resource blocks used for cell-broadcast data may be signaled by SIB or master information block (MIB). In each location, a UE may find the cell-broadcast data based on different RNTI such as SI-RNTI, P-RNTI, RA-RNTI, etc. If SIB signals the resource pool, at least the fixed resource location may be assumed for the SIB signaling the resource pool.

Alternatively, in terms of allocating the location of resources for cell-broadcast data, the size of resource per each resource may be prefixed as 6 PRBs or 2/3/4 PRBs.

2. MCS determination according to an embodiment of the present invention is described. In terms of MCS used for cell-broadcast data, it is currently assumed that the UE shall use $Q_m=2$ if the DCI CRC is scrambled by P-RNTI, RA-RNTI, or SI-RNTI. Accordingly, the same scheme may be applied to cell-broadcast data without the associated DCI.

3. TBS determination according to an embodiment of the present invention is described. At least one of followings may be considered for TBS determination.

(1) TBS may be associated with P-RNTI, and fixed for RA-RNTI. For SI-RNTI, the TBS may be configured by preceding SIB (e.g. SIB1 determines the size of SIB2, and so on). When a UE is configured with P-RNTI, the TBS may also be configured. Or, a predetermined mapping between TBS and P-RNTI may also be considered. This mapping may also be dependent on the coverage level that the UE is supported on. For example, TBs may be determined based on P-RNTI and the coverage level that the UE is configured with (or the maximum coverage enhancement level that the network supports). This may allow different TBS of paging at least per UE. For, this P-RNTI may be scrambled with CRC.

(2) TBS may be associated with prefixed size for paging and RAR regardless of RNTI. This may not allow flexible TBS for different UEs. In this case, for example, TBS may be configured by the network which is common to all UEs per each type of cell-broadcast data. The same TBS may be used by UEs sharing the same coverage level. In this case, TBS per coverage level may be configured. Also, the TBS may be determined based on the maximum coverage level that the network supports. If the network supports large coverage level, the TBS may be small to minimize the repetition, whereas if the maximum coverage level is small, the TBS may be large to maximize spectral efficiency.

(3) Similar to (E)PDCCH or by utilizing (E)PDCCH structure to transmit cell-broadcast data, TBS may be associated with aggregation level. Hereinafter, when the cell-broadcast data is transmitted by utilizing (E)PDCCH structure, it may be called that the cell-broadcast data is transmitted via enhanced PDSCH (EPDSCH). For example, aggregation level 1 may be mapped to TBS 1 and aggregation level 2 may be mapped to TBS 2, and so on. The mapping of aggregation level to TBS may be configured by higher layer or prefixed by a mapping table. Per each RNTI, the mapping between aggregation level and TBS may be configured by higher layer or prefixed/predetermined. Also, the TBS may be different per maximum coverage level that the network supports. In other words, TBS may be determined based on aggregation level (or search space), and/or maximum coverage enhancement level that the network supports, and/or RNTI (and/or other factors).

4. Search space and EPDCCH design to support EPDSCH according to an embodiment of the present invention is described.

(1) Scrambling: Scrambling for EPDSH may be performed as similar as PDSCH. That is, For each codeword q, the block of bits $b^{(q)}(0), \ldots, b^{(q)}(M_{bit}^{(q)}-1)$, where $M_{bit}^{(q)}$ is the number of bits in codeword q transmitted on the physical channel in one subframe, shall be scrambled prior to modulation, resulting in a block of scrambled bits according to Equation 1.

$$\tilde{b}^{(q)}(i)=(b^{(q)}(i)+c^{(q)}(i)) \bmod 2 \qquad \text{<Equation 1>}$$

where $c^{(q)}(i)$ is the scrambling sequence. The scrambling sequence generator shall be initialized at the start of each subframe, where the initialization value of $c_{init}$ depends on the transport channel type according to Equation 2.

$$c_{init} = \qquad \text{< Equation 2 >}$$
$$\begin{cases} n_{RNTI} \cdot 2^{14} + q \cdot 2^{13} + \lfloor n_s/2 \rfloor \cdot 2^9 + N_{ID}^{cell} & \text{for } EPDSCH \\ \lfloor n_s/2 \rfloor \cdot 2^9 + N_{ID}^{MBSFN} & \text{for } PMCH \end{cases}$$

Where $n_{RNTI}$ corresponds to the RNTI associated with the EPDSCH transmission.

(2) EPDCCH related configurations: EPDCCH related configurations may be expected to configure EPDCCH. The necessary configuration may be prefixed or configured by SIB1 or physical broadcast channel (PBCH). The EPDCCH related configuration may be EPDCCH-Config information element (IE) configured by the higher layer. The EPDCCH-Config IE specifies the subframes and resource blocks for EPDCCH monitoring that E-UTRAN may configure for a serving cell. Table 1 shows the EPDCCH-Config IE.

TABLE 1

-- ASN1STARTEPDCCH-Config-r11 ::= SEQUENCE{config-r11
CHOICE {release NULL,setup SEQUENCE {subframePatternConfig-
r11 CHOICE {release NULL,setup SEQUENCE {subframePattern-r11
MeasSubframePattern-r10}} OPTIONAL, -- Need ONstartSymbol-r11
INTEGER (1..4) OPTIONAL, -- Need OPsetConfigToReleaseList-r11
EPDCCH-SetConfigToReleaseList-r11 OPTIONAL,
-- Need ONsetConfigToAddModList-r11 EPDCCH-
SetConfigToAddModList-r11 OPTIONAL -- Need ON}}}EPDCCH-
SetConfigToAddModList-r11 ::= SEQUENCE TABLE 1-continued

```
(SIZE(1..maxEPDCCH-Set-r11)) OF EPDCCH-
SetConfig-r11EPDCCH-SetConfigToReleaseList-r11 ::= SEQUENCE
(SIZE(1..maxEPDCCH-Set-r11)) OF EPDCCH-Set-
ConfigId-r11EPDCCH-SetConfig-r11 ::= SEQUENCE
{setConfigId-r11 EPDCCH-SetConfigId-r11,transmissionType-r11
ENUMERATED {localised, distributed},resourceBlockAssignment-
r11 SEQUENCE{numberPRB-Pairs-r11 ENUMERATED
{n2, n4, n8},resourceBlockAssignment-r11 BIT STRING
(SIZE(4..38)) },dmrs-ScramblingSequenceInt-r11 INTEGER
(0..503),pucch-ResourceStartOffset-r11 INTEGER
(0..2047),re-MappingQCL-ConfigId-r11 PDSCH-RE-
MappingQCL-ConfigId-r11 OPTIONAL, -- Need OR...}
EPDCCH-SetConfigId-r11 ::= INTEGER (0..1)--
ASN1STOP
```

Referring to Table 1, the EPDCCH-SetConfig field provides EPDCCH configuration set. E-UTRAN configures at least one EPDCCH-SetConfig when EPDCCH-Config is configured. The resourceBlockAssignment field indicates the index to a specific combination of physical resource-block pair for EPDCCH set. The dmrs-ScramblingSequenceInt field indicates the demodulation reference signal (DMRS) scrambling sequence initialization parameter $n_{ID,i}^{EPDCCH}$. The re-MappingQCL-ConfigId field indicates the starting OFDM symbol, the related rate matching parameters and quasi co-location (QCL) assumption for EPDCCH when the UE is configured with transmission mode (TM) 10. This field provides the identity of a configured PDSCH—RE-MappingQCL-Config. E-UTRAN configures this field only when TM10 is configured.

For EPDSCH, if the EPDCCH related configuration is prefixed, it may be assumed that the set of EPDSCH resource (resourceBlockAssignment) is prefixed. It may be configured by SIB/PBCH as well. Further, the Dmrs-ScramblingSequence may also be prefixed which may be determined based on cell ID instead of UE-specific parameter. It may be a function of cell ID and slot/subframe/radio frame index. Similar to PDSCH scrambling, scrambling sequence generator can be initialized based on cell ID (and/or slot index, and/or RNTI). Further, QCL information (re-MappingQCL-ConfigId) may not be needed, since cell ID is used for scrambling/DMRS generation, etc.

(3) Redundancy vector (RV): Currently, RV may be used if DCI 1A schedules random access response (RAR), paging and/or SIB. Without the associated DCI, the usage of RV becomes a bit challenging. Accordingly, RV may be set to 0. In other words, RV may not be used for EPDSCH. Alternatively, RV may be associated with system frame number (SFN) or subframe index. RV may be determined based on SFN or slot/subframe index. Similar mechanism used for SIB may be used for this purpose. Or, RV may be determined based on SFN and/or RNTI.

(4) Search space multiplexing with EPDCCH: To support EPDSCH blind detection, in terms of search space, one of the following two approaches may be considered.

For the first approach, UE-specific search space with different RNTI may be utilized or shared. If a UE needs to monitor cell-broadcast data and UE-specific search space (USS) DCI for control channel, a UE may expect that at most one EPDSCH is transmitted in one subframe or a subframe bundle and at most two (downlink scheduling DCI and uplink grant DCI) EPDCCHs are transmitted in the same subframe or the same subframe bundle. If a UE does not need to monitor cell-broadcast data and USS DCI in the same time, a UE may be preconfigured by the higher layer or prefixed or signaled by MIB/SIB the subset of subframes/ timing where a UE can monitor EPDSCH and where a UE can monitor EPDCCH (or DCI). This may simplify the UE implementation, yet, this may require pre-configuration or configuration of subframe sets for each purpose. If cell-broadcast data including SIB is transmitted via EPDSCH, at first, a UE may only monitor EPDSCH until higher layer configuration is given to indicate a set of subframes (such as EPDCCH monitoring subframe set) where a UE can monitor USS for DCI to schedule DL/UL data. In this case, for example, the search space or monitoring behavior for paging may change according to Table 2. Table 2 shows EPDSCH configured by P-RNTI.

TABLE 2

| TBS | Search Space | Transmission scheme of PDSCH corresponding to PDCCH |
|---|---|---|
| TBS1 | UE-specific | If the number of PBCH antenna ports is one, Single-antenna port, port 0 is used, otherwise Transmit diversity |
| TBS2 | UE-specific | If the number of PBCH antenna ports is one, Single-antenna port, port 0 is used, otherwise Transmit diversity |
| . . . | | |

For the second approach, separate search space for EPDSCH may be configured. This may add additional burden on UE blind detection to include additional search space to locate EPDSCH. In this case, limited aggregations may be considered. However, if the limited number of aggregations is supported, the number of different TBS may also be limited. In terms of search space, it may be similar to USS with different hashing function. To minimize UE complexity, a UE may not be required to monitor EPDSCH and EPDCCH at the same time. Or, the number of blind detection capability that the UE has can be divided to two sets. For this, the design principle or search space used for EPDCCH CSS may be utilized. For example, the RE location corresponding to EPDSCH candidate m of the search space $ES_k^{(L)}$ are given by Equation 3.

$$L\left\{\left[\left\lfloor \frac{m \cdot N_{ECCE,2,k}}{L \cdot M_p^{(L)}} \right\rfloor\right] \mod \lfloor N_{ECCE,2,k}/L \rfloor\right\} + i \qquad < \text{Equation 3} >$$

Where a UE can assume a predetermined or higher-layer configured EPDCCH-PRB-set 2 (additional PRB set in addition to one or two EPDCCH-PRB-set configured for unicast data). In Equation 3, i=0, . . . , L−1 and m= 0,1, . . . , $M_p^{(L)}$−1. $M_p^{(L)}$ is the number of EPDSCH candidates to monitor at aggregation level L (or TBS candidate level L) in EPDCCH-PRB-set 2 for the serving cell on which EPDCCH is monitored.

FIG. 6 shows a method for transmitting cell-broadcast data according to an embodiment of the present invention.

In step S100, the base station determines a TBS based on an aggregation level. Different TBSs may be determined based on different aggregation levels. Mapping between the different TBSs and the different aggregation levels may be configured by a mapping table. Mapping between the different TBSs and the different aggregation levels may be configured by a higher layer or pre-fixed. The TBS may be determined further based on a RNTI. Further, the TBS may be determined further based on a maximum coverage enhancement level that the base station supports.

In step S110, the base station transmits the cell-broadcast data to a MTC UE by using the TBS. A set of resources for the cell-broadcast data may be pre-fixed. A DMRS scrambling sequence initialization parameter for the cell-broadcast data may be pre-fixed. The DMRS scrambling sequence initialization parameter may be determined based on a cell ID. A RV for the cell-broadcast data may not be used or determined based on a SFN or a subframe index. Further, a search space for the cell-broadcast data may be configured by a UE-specific search space for an EPDCCH with different RNTI or configured separately from a search space for an EPDCCH.

Further, the above description according to embodiments of the present invention may be applied to the embodiment of FIG. 6.

FIG. 7 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MTC UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a base station, cell-broadcast data in a wireless communication system, the method comprising:
   determining, by the base station, a transport block size (TBS) based on an aggregation level and a maximum coverage enhancement level that the base station supports,
   wherein the TBS is determined to be small if the maximum coverage enhancement level that the base station supports is large, and
   wherein the TBS is determined to be large if the maximum coverage enhancement level that the base station supports is small; and
   transmitting, by the base station, the cell-broadcast data to a machine-type communication (MTC) user equipment (UE) by using the TBS.

2. The method of claim 1, wherein different TBSs are determined based on different aggregation levels.

3. The method of claim 2, wherein mapping between the different TBSs and the different aggregation levels is configured by a mapping table.

4. The method of claim 2, wherein mapping between the different TBSs and the different aggregation levels is configured by a higher layer or pre-fixed.

5. The method of claim 1, wherein the TBS is determined further based on a radio network temporary identity (RNTI).

6. The method of claim 1, wherein a set of resources for the cell-broadcast data is pre-fixed.

7. The method of claim 1, wherein a demodulation reference signal (DMRS) scrambling sequence initialization parameter for the cell-broadcast data is pre-fixed.

8. The method of claim 7, wherein the DMRS scrambling sequence initialization parameter is determined based on a cell identifier (ID).

9. The method of claim 1, wherein a redundancy vector (RV) for the cell-broadcast data is not used.

10. The method of claim 1, wherein a redundancy vector (RV) for the cell-broadcast data is determined based on a system frame number (SFN) or a subframe index.

11. The method of claim 1, wherein a search space for the cell-broadcast data is configured by a UE-specific search space for an enhanced physical downlink control channel (EPDCCH) with different radio network temporary identities (RNTIs).

12. The method of claim 1, wherein a search space for the cell-broadcast data is configured separately from a search space for an enhanced physical downlink control channel (EPDCCH).

13. A base station comprising:
   a memory;
   a transceiver; and
   a processor coupled to the memory and the transceiver, and configured to:
      determine a transport block size (TBS) based on an aggregation level and a maximum coverage enhancement level that the base station supports,
      wherein the TBS is determined to be small if the maximum coverage enhancement level that the base station supports is large, and
      wherein the TBS is determined to be large if the maximum coverage enhancement level that the base station supports is small; and
      control the transceiver to transmit a cell-broadcast data to a machine-type communication (MTC) user equipment (UE) by using the TBS.

14. The base station of claim 13, wherein different TBSs are determined based on different aggregation levels.

\* \* \* \* \*